United States Patent
Chen (10) Patent No.: US 8,393,206 B1
(45) Date of Patent: Mar. 12, 2013

(54) DRY WIND TUNNEL SYSTEM

(76) Inventor: Ping-Chih Chen, Scottsdale, AZ (US)

( * ) Notice: Subject to any disclaimer, the term of this patent is extended or adjusted under 35 U.S.C. 154(b) by 321 days.

(21) Appl. No.: 12/702,510

(22) Filed: Feb. 9, 2010

(51) Int. Cl.
*G01M 9/00* (2006.01)

(52) U.S. Cl. .......................................... 73/147

(58) Field of Classification Search .................. None
See application file for complete search history.

(56) References Cited

U.S. PATENT DOCUMENTS

| | | | | |
|---|---|---|---|---|
| 4,327,581 A | * | 5/1982 | Jackson et al. | 73/147 |
| 4,372,157 A | * | 2/1983 | Caruthers et al. | 73/147 |
| 4,372,158 A | * | 2/1983 | Doggett et al. | 73/147 |
| 4,372,159 A | * | 2/1983 | Doggett et al. | 73/147 |
| 4,665,578 A | * | 5/1987 | Kawada et al. | 14/74.5 |
| 4,862,739 A | * | 9/1989 | Dobbs | 73/147 |
| 7,942,049 B2 | * | 5/2011 | Fritz et al. | 73/147 |

FOREIGN PATENT DOCUMENTS

| | | | | |
|---|---|---|---|---|
| JP | 04106445 A | * | 4/1992 | |
| JP | 05079944 A | * | 3/1993 | |
| JP | 2002168727 A | * | 6/2002 | |
| RU | 1172362 C | * | 9/1994 | |

* cited by examiner

Primary Examiner — Andre Allen (74) Attorney, Agent, or Firm — Keith L. Jenkins, Registered Patent Attorney, LLC; Keith L. Jenkins (57) ABSTRACT

This invention is a ground flutter testing system without a wind tunnel, called Dry Wind Tunnel (DWT) System. The DWT system consists of a Ground Vibration Test (GVT) hardware system, a multiple input multiple output (MIMO) force controller software, and a real-time unsteady aerodynamic force generation software, that is developed from an aerodynamic reduced order model (ROM). The ground flutter test using the DWT System operates on a real structural model, therefore no scaled-down structural model, which is required by the conventional wind tunnel flutter test, is involved. Furthermore, the impact of the structural nonlinearities on the aeroelastic stability can be included automatically. Moreover, the aeroservoelastic characteristics of the aircraft can be easily measured by simply including the flight control system in-the-loop. In addition, the unsteady aerodynamics generated computationally is interference-free from the wind tunnel walls. Finally, the DWT System can be conveniently and inexpensively carried out as a post GVT test with the same hardware, only with some possible rearrangement of the shakers and the inclusion of additional sensors.

1 Claim, 6 Drawing Sheets

DRY WIND TUNNEL SYSTEM

STATEMENT OF GOVERNMENT INVOLVEMENT

This application involves an invention made with United States Government support under a Small business Technology Transfer (STTR) Program, Phase I entitled, "GVT-Based Ground Flutter Test without Wind Tunnel," having Contract Number: NNX08CD34P awarded by NASA Dryden Flight Research Center (National Aeronautics and Space Administration's Dryden Flight Research Center, Edwards, Calif. 93523).

FIELD OF THE INVENTION

The present invention relates generally to a method by which software tools and hardware systems simulates flight tests/wind tunnel tests on an aircraft, part of an aircraft, or any other flexible structure to search the aeroelastic/aeroservoelastic (AE/ASE) instabilities of the test structure. More particularly, the present invention relates to a method which uses software and hardware components for the simulation of a flexible structure's AE/ASE characteristics at various flight conditions.

BACKGROUND OF THE INVENTION

Prior to flight testing an aircraft structure or any part of a flexible structure, flutter wind-tunnel tests are required to search for AE/ASE instabilities of the structure's configurations. Flutter wind-tunnel testing is an expensive and complicated process because it involves the design and fabrication of a scaled-down aeroelastic structural model, which is a scaled-down version of a real structure, and also because wind-tunnel time is costly. Flutter wind-tunnel tests are necessary because if a flutter instability is not found prior to the flight test then major instabilities may occur during the flight tests which can make the structure extremely unstable, hence endangering the aircraft structure and passengers. Unfortunately, creating a scaled-down version of a real structure may introduce discrepancies in the structural characteristics of the scaled-down structure when compared to the real structure. For example, the control surface actuators with corresponding stiffness and damping, are difficult to represent accurately in the scaled-down structure. Also, the incorporation of the accurate modal damping in the scaled-down structural model is almost impossible. These discrepancies between the actual structure and the scaled-down versions can lead to uncertainties in the measured aeroelastic instability boundary. In addition, during flutter wind-tunnel tests the wind-tunnel walls interfere with the test results.

It is very costly to include structural nonlinearities such as friction, free-play, etc. in the scaled-down structural model. And even when these structural nonlinearities are included in the scaled-down version of the structure they will never be identical to the real structure. These structural nonlinearities can have a major impact on the aeroelastic characteristics of the aircraft. The measurement of the coupling between the flight control system and the aeroelastic system to search for ASE instabilities of the aircraft is another critical design requirement that can be accomplished by performing a flutter wind-tunnel test in the presence of flight control laws. However, performing this aeroservoelastic (ASE) measurement in the wind tunnel is also a very expensive process, thus the ASE analysis largely relies on flight tests.

If the flutter wind-tunnel test was able to use the real-structure then the control laws would automatically be included, since the real structure has control laws included in it to be able to fly. With the use of a real-structure there would be no scaling discrepancies between the tested structure and the actual structure. The impact of the structural nonlinearities on aeroelastic stability can automatically be included. If the flutter test could be conducted without a wind-tunnel then the unsteady aerodynamics generated computationally would be interference-free from the wind-tunnel walls.

In order to be able to conduct a flutter test without a wind-tunnel, a ROM (Reduced Order Model) of the unsteady aerodynamic model is needed. This unsteady aerodynamic ROM represents an aerodynamic transfer function that inputs the physical structural deformation and outputs the aerodynamic forces. Thus, this requirement immediately rules out the Computational Fluid Dynamics (CFD)-based ROM's because all CFD-based ROM's involve some type of modal approach that assumes the structural mode shapes are known.

SUMMARY OF THE INVENTION

The object of this invention is to provide a method for accurate calculations of an aircraft structures' aeroelastic instabilities at a comparatively low testing outlay.

The term "Dry Wind Tunnel System" ("DWT System") refers to a system that consists of a Ground Vibration Test ("GVT") hardware system, a data acquisition system, a real-time unsteady aerodynamic force generation software module and a multiple input multiple output (MIMO) force controller software module.

As used herein, the term "Ground Vibration Test hardware system" ("GVT System" or "GVT Hardware" or "GVT Hardware System") refers to a test that includes state-of-the-art equipment including devices such as aircraft soft-support, structural excitation, vibration sensors, and data acquisition and analysis tools. The GVT Hardware used by the DWT System is essentially a ground vibration test system which consists of vibration sensors, shakers, and load cells. The vibration sensors are devises such as accelerometers, linear variable differential transformer's (LVDT), and linear velocity transducer (LVT). The accelerometers measure the acceleration of the structure at each sensor location. The LVDT's measure the displacement of the structure at each sensor location. The LVT's measure the velocity of the structure at each sensor location. The shakers are a structural excitation device, in which they exert forces onto the structure at each shaker location. Each shaker can exert forces different from the other shakers. The load cells are devices which measure/monitor the amount of force being exerted by the shakers onto the structure.

The real-time unsteady aerodynamic force generation software is a reduced order model (ROM) of the unsteady aerodynamics that has a real-time computational efficiency for unsteady aerodynamic force generation at different flight conditions. This computer software program reads the structural responses as its inputs, and the desired unsteady aerodynamic forces at each shaker's location are computed by passing the structural response input to the reduced order model of the unsteady aerodynamics.

The ROM that the real-time unsteady aerodynamic force generation software uses is created by the GVTOPT Module of the ZAERO Software System (ZAERO is ZONA Technology, Inc.'s commercial software product for aeroelastic/aeroservoelastic analysis). The basic requirement in formulating an unsteady aerodynamic ROM for the dry wind tunnel test is that it contains only the aerodynamic characteristics of the configuration and does not involve any structural characteristics. This is because the coupling between the aerodynamics and structures is achieved only during the real-time test; thereby the structural characteristics cannot be known prior to the test.

Prior to the DWT System test, the ROM matrices, computed by the GVTOPT Module at each flight condition, are saved in a look-up table database. During the DWT System test, the ROM matrices saved in the look-up table can be directly called by the real-time unsteady aerodynamic force generation software to generate the real-time unsteady aerodynamic force for flutter testing.

The data acquisition system is such a device that connects hardware devices (such as sensors and actuators) and computers. The data acquisition system collects the analog signals measured from sensors, converts it into digital signals, and sends the converted digital signals to the computer for analysis. Visa versa, the data acquisition system can also covert the digital signals coming from the computer into analog signals, and send them back it to the hardware devices.

The MIMO force controller software is performed to ensure the forces exerted to the flexible aircraft structure by the shakers are the desired unsteady aerodynamics forces, which are computed by the real time unsteady aerodynamic force generation software at each shaker location. Furthermore, the MIMO force controller is applied to minimize the interference among the shakers and reduce the nonlinear effects due to the nonlinear characteristics of the shaker dynamics. The MIMO force controller software can be designed using the standard robust control design technique such as $H_\infty$ and $\mu$ tools. To facilitate the MIMO force controller design process, a system identification technology is implemented to estimate a MIMO shaker dynamics, instead of using the analytical tool for a complicated mathematical shaker model. Therefore, an experiment is performed by exerting a set of sweep sinusoidal signals to the shakers to excite the structure. The input sweep sinusoidal signals and the output forces signals on the structure measured by load cell sensors are used for model estimation of the shaker dynamics.

The DWT System concept would be particularly useful as a pre-flight testing effort to identify any aeroelastic and aeroservoelastic instability on new and/or modified aircraft Inherent structural nonlinearities such as friction and freeplay are notoriously difficult to model properly in linearized analyses, but would naturally be present in the DWT System testing as it is carried out on the actual structure. The ground flutter test using the DWT System operates on the real structural model, therefore, unlike in the flutter wind-tunnel test no scaled-down structural model is involved.

Also, the impact of the structural nonlinearities on the aeroelastic stability can automatically be included. In addition, the aeroservoelastic characteristics of the aircraft can be easily measured by simply including the flight control system in the loop. The unsteady aerodynamics generated computationally would have no interference from the wind-tunnel walls. The DWT System takes full advantage of the existing GVT Hardware setup in that the required DWT System's setup, for flutter testing, uses similar hardware as the GVT System of the same aircraft structure, only with some possible rearrangement of the shakers and the inclusion of additional sensors. Once setup, the DWT System will perform the ground flutter test and requires only a link between the software programs and the GVT Hardware. Testing using the DWT System would also be useful as a post-flight testing procedure to resolve any discrepancies between the analysis and flight test results. The DWT System concept is applicable to a broad range of test structures, from components such as flexible wings to full aircrafts.

DETAILED DESCRIPTION OF THE INVENTION

The present invention may be described herein in terms of various functional components and various methods/steps. It should be appreciated that such functional components may be realized by any number of structural components, hardware, and/or software configurations to perform the specified functions. For example, the present invention may employ various electronic components, hardware, and software, which can be suitably configured for various intended purposes; such as testing a real aircraft structure or part of a real aircraft structure to predict the instabilities of said structure.

Figure 1:
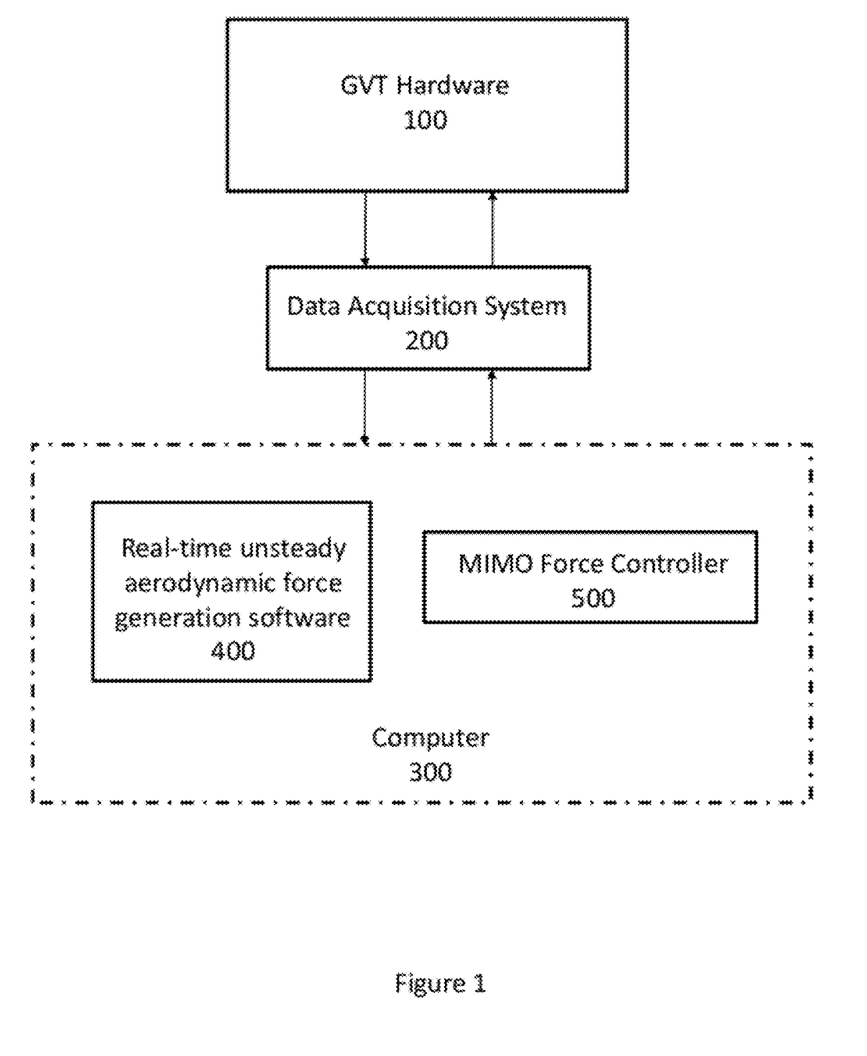
FIG. 1 demonstrates the interaction between the GVT Hardware System, the data acquisition system, and the computer system in which the MIMO force controller and the real-time unsteady aerodynamic force generation software are uploaded.

FIG. 1 demonstrates the data flow between the GVT Hardware System 100, the data acquisition system 200, and the computer 300, in which the real-time unsteady aerodynamic force generation software 400, and the MIMO force controller 500 are installed on.

Figure 2:
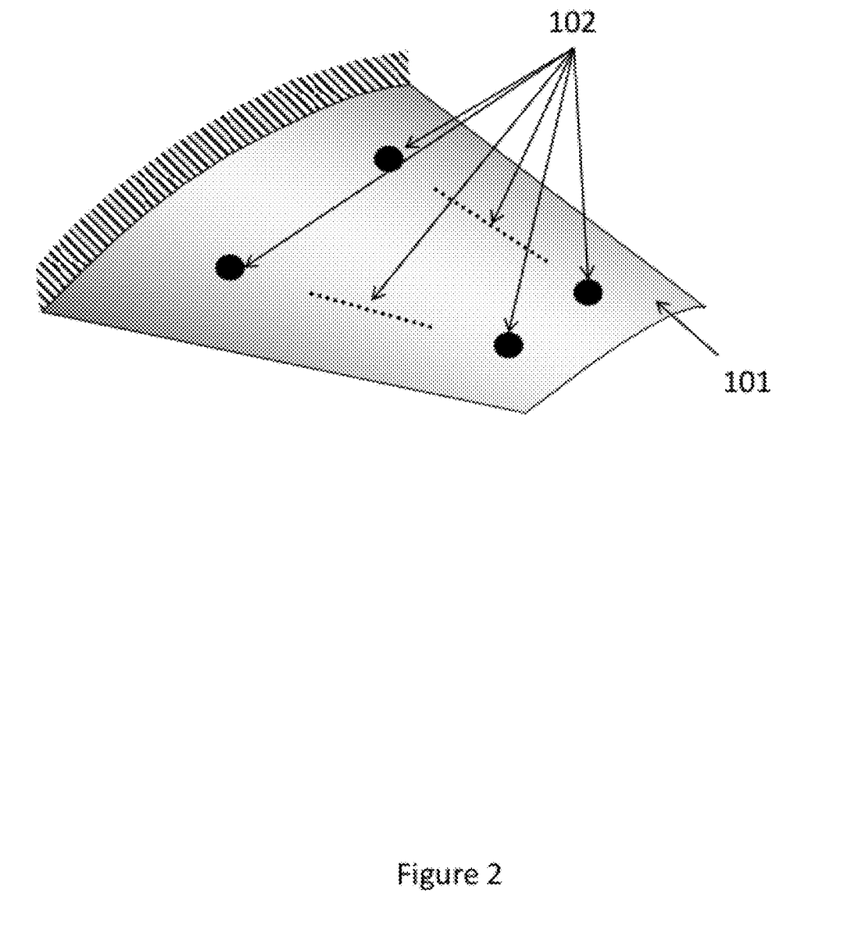
FIG. 2 illustrates a structure with sensors.

FIG. 2 illustrates a structure 101 with sensors 102 on it. The sensors 102 are things like accelerometers, which measure the oscillation at each sensor's location; linear velocity transducer (LVT), which measure the velocity at each sensor's location; and linear variable differential transformer's (LVDT), which measure the structure's displacement at each sensor's location.

Figure 3:
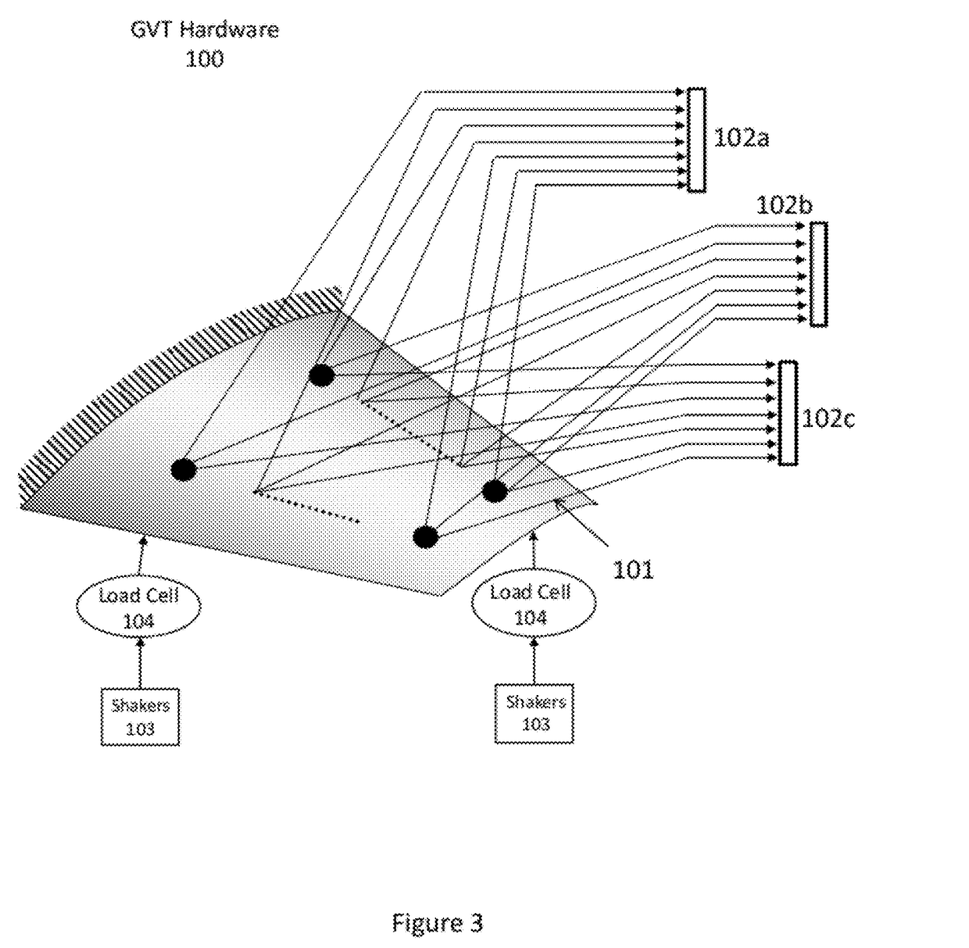
FIG. 3 illustrates the GVT Hardware System.

FIG. 3 illustrates the GVT Hardware System 100. The GVT Hardware System includes sensors 102a, 102b, and 102c, placed on a structure 101. Shakers 103 exert forces onto the structure. The load cells 104 measure the amount of force the shakers are exerting onto the structure. The sensors 102a, 102b, and 102c, measure the displacement, velocity and acceleration at each sensor location.

Figure 4:
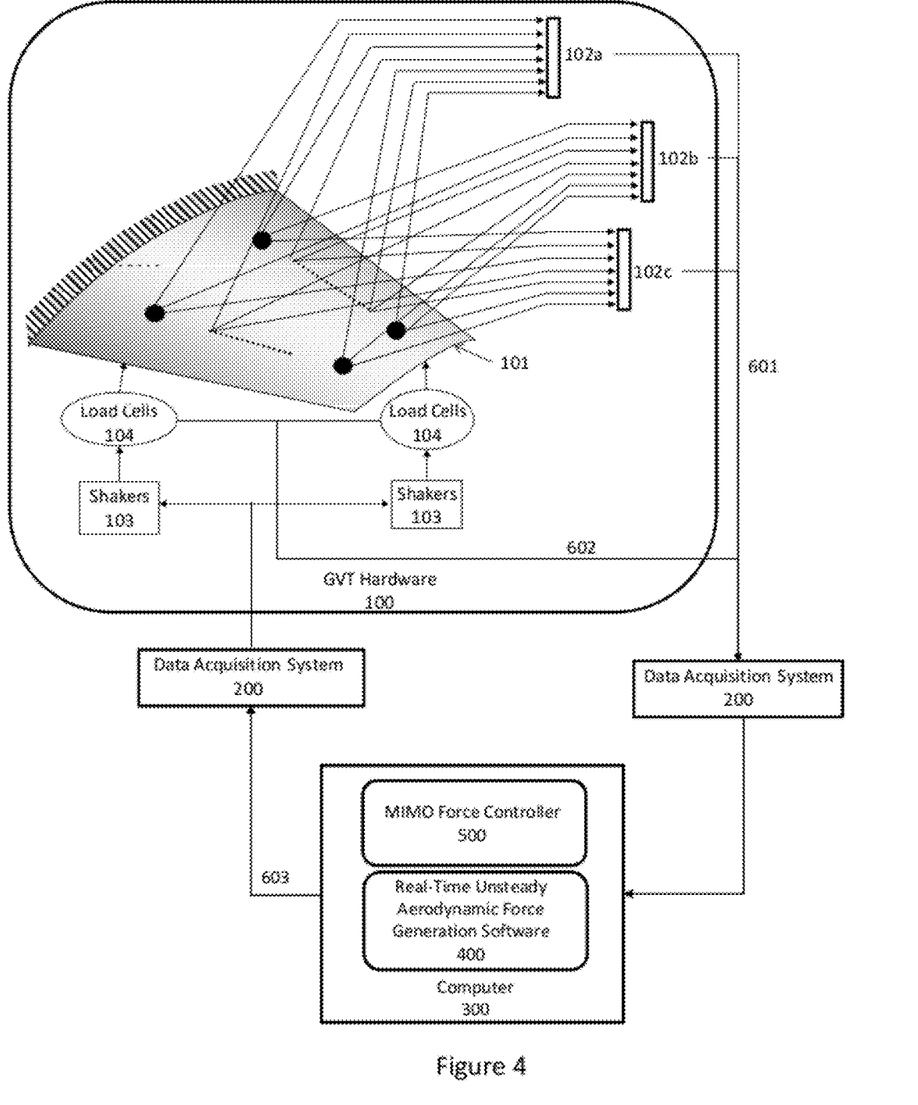
FIG. 4 illustrates the Dry-Wind Tunnel System with all of the component and how they interact each other.

FIG. 4 illustrates the Dry-Wind Tunnel System process. During the flutter test, one of the shakers 103 creates a small impulse as the initial disturbance to excite the structure 101. The sensors 102a, 102b, and 102c are used to measure the displacement, velocity and acceleration at each designed locations of the test structure. The data acquisition system 200 transfers the data measured by the sensors 102a, 102b and 102c to the computer 300. Within the computer the information from the sensors 102a-102c, goes to the real-time unsteady aerodynamic force generation software 400. The real-time unsteady aerodynamic force generation software 400 uses the data from the sensor 102a-102c, to calculate the desired forces the shakers 103 should exert at each shaker 103 location onto the structure 101 to search AE/ASE instability of the structure 101. After the desired forces have been calculated by the real-time unsteady aerodynamic force generation software 400, the GVT Hardware System 100 starts exciting the structure to search for the potential AE/ASE instability of the structure 101. The load cells 104 measure the force exerted by the shakers 103. The data acquisition system 200 passes the load cell 104 measurements to the computer 300. Within the computer 300 the measurements are passed to the MIMO force controller 500. The MIMO force controller 500 acts to enforce the forces exerted by the shakers 103 onto the structure 101 are same as the desired forces generated by the real-time unsteady aerodynamic generation software. Specifically, the MIMO force controller 500 uses the load cell 104 measurements to monitor if the forces exerted by the shakers 103 onto the structure 101 are the same as the desired force generated by the real-time unsteady aerodynamic force generation software 400. If any discrepancy between the measurement of the load cell 104 and the desired force generated by the real-time unsteady aerodynamic force generation software 400 occurs, the MIMO force controller 500 generates a correct excitation force signal to the shakers 103 to excite the structure 101.

Figure 5:
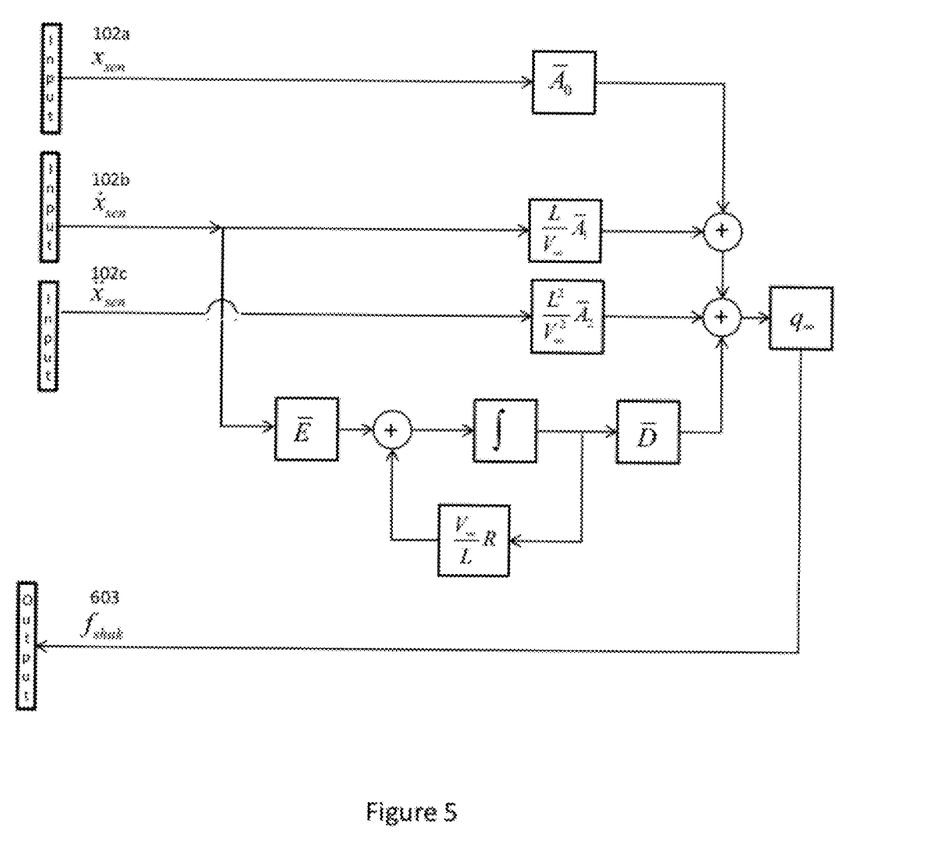
FIG. 5 illustrates the real-time unsteady aerodynamic force generation software process.

FIG. 5 demonstrates the real-time unsteady aerodynamic force generation software's process for determining the correct force that should be applied by the shakers 103 (FIG. 4) onto the structure 101 (FIG. 4) to search for the AE/ASE instabilities of the structure 101. The real-time unsteady aerodynamic force generation software is a reduced order model (ROM) of the unsteady aerodynamics that has a real-time computational efficiency for unsteady aerodynamic force generation. All the variables presented in FIG. 5 are pre-computed via the GVTOPT module of the ZAERO software system at different flight conditions, and a lookup table for these variables can be generated to incorporate variation of the flight conditions.

The basic requirement in formulating an unsteady aerodynamic ROM for the dry wind tunnel test is that it contains only the aerodynamic characteristics of the configuration and does not include any structural characteristics. This is because the coupling between aerodynamics and structures is achieved only during the real time test; thereby the structural characteristics cannot be known prior to the test.

In fact, this unsteady aerodynamic ROM represents an aerodynamic transfer function that inputs the physical structural deformation and outputs the aerodynamic forces. Thus, this requirement immediately rules out the CFD-based ROM because all CFD-based ROM's involve some type of modal approach that assumes the structural mode shapes to be known. On the other hand, the unsteady aerodynamic panel methods such as the Doublet Lattice method DLM, ZONA6, and ZONA7 do readily generate an aerodynamic influence coefficient (AIC) matrix that relates the structural deformation (x) to the aerodynamic forces ($f_a$) which reads:

$$\{f_a(\omega)\} = q_\infty [AIC(\omega)]\{X\} \tag{1}$$

where $q_\infty$ is the dynamic pressure, and w is the oscillating frequency indicating that the AIC matrix is formulated in the frequency domain.

Closely examining the AIC matrix, one can see that each coefficient in the matrix represents the response on a receiving panel to a unit input on a sending panel. For a $N_P$ number of aerodynamic panels in the aerodynamic model, the size of the AIC matrix is $N_P \times N_P$. Thus, the AIC matrix truly represents an aerodynamic transfer function that contains only the aerodynamic characteristics of the configuration. The AIC matrix generated by the linear unsteady aerodynamic methods can accurately produce aerodynamic forces at the subsonic and supersonic Mach numbers. For transonic flows, the transonic AIC matrix can be generated by using an unsteady transonic method called ZTRAN. ZTRAN uses an overset field-panel method to solve the linearized transonic small disturbance equation with the steady background flow being imported from a high fidelity CFD code such as a Navier-Stokes solver. The accuracy of the ZONA6 and ZONA7 methods for subsonic and supersonic Mach numbers and the ZTRAN method for transonic Mach number has been demonstrated on many test cases.

To obtain a time-domain aerodynamic transfer function, requires transforming the frequency-domain AIC matrix into time domain. This can be achieved using the minimum state method that fits the AIC matrices at a set of frequencies in to a rational function approximation which reads:

$$\{f_a(t)\} = q_\infty \left[ [A_0] + \frac{L}{V_\infty}[A_1]s + \frac{L^2}{V_\infty^2}[A_2]s^2 \right]\{X\} + q_\infty[D]\left[[I]s - \frac{V_\infty}{L}[R]\right]^{-1}[E]\{\dot{X}\} \tag{2}$$

where s is the Laplace variable, L is the reference length, $V_\infty$ is the free-stream velocity. $[A_0]$, $[A_1]$, $[A_2]$, $[D]$, and $[E]$ are the resulting matrices from the minimum state method, and $[R]$ is a diagonal matrix with the diagonal coefficients being the $N_L$ assigned aerodynamic lags. Thus, the size of $[R]$ is $N_L \times N_L$. Usually, no more than ten aerodynamic lags are sufficient to obtain an accurate rational function approximation.

The vectors $\{X\}$ and $\{f_a(t)\}$ in Eq. (2) are the structural deformations and aerodynamic forces at the aerodynamic panels, respectively. Therefore, for $N_P$ aerodynamic panels, the size of the vectors $\{X\}$ and $\{at\}$ is $N_P \times 1$. However, in the GVT the structural deformations are measured at the sensor locations and the aerodynamic forces are produced at the shaker locations. To transfer these structural deformation and aerodynamic forces from the aerodynamic panels to the sensor and shaker locations requires an interpolation procedure which can be accomplished by using the spline method such as the infinite plate spline method, the thin plate spline method, and the beam spline method that jointly generate a spline matrices for such displacement and force transferal. For $N_S$ accelerometers, the displacement spline matrix reads:

$$\{X\}_{N_P \times 1} = [G_s]_{N_P \times N_S}\{X_{sen}\}_{N_P \times 1} \tag{3}$$

where $\{X_{sen}\}$ is the structural deformation at the $N_S$ sensors, and $[G_s]$ is a displacement spline matrix that transfers the structural deformations from the sensor locations to the control points of the aerodynamic panels.

For $N_A$ shakers, the force spline matrix reads:

$$\{f_{shak}\}_{N_A \times 1} = [G_f]_{N_A \times N_P}\{f_a\}_{N_P \times 1} \tag{4}$$

where $f_{shak}$ is the aerodynamic forces at the shaker locations, and $[G_f]$ is the force spline matrix that transfers the forces at the control points of the aerodynamic panels to the shaker locations.

Substituting Eqn.(3) and Eqn.(4) into Eqn.(2) yields a reduced-order model of the unsteady aerodynamics shown in the following equation:

$$\{f_{shak}\} = q_\infty \left[ [\bar{A}_0] + \frac{L}{V_\infty}[\bar{A}_1]s + \frac{L^2}{V_\infty^2}[\bar{A}_2]s^2 \right]\{X_{sen}\} + q_\infty[\bar{D}]\left[[I]s - \frac{V_\infty}{L}[R]\right]^{-1}[\bar{E}]\{\dot{X}_{sen}\} \tag{5}$$

where $[\bar{A}_0],[\bar{A}_1],[\bar{A}_2]=[G_f][[A_0],[A_1],[A_2]][G_s]$ with size of $N_A \times N_S$, $\bar{D}=[G_f]\{D\}$ with size of $N_A \times N_L$, $\bar{E}=[E][G_s]$ with size of $N_L \times N_S$.

In a typical GVT set-up, the numbers of sensors and shakers are typically small.

Accordingly, the size of the matrices in Eqn.(5) is small, implying that Eqn.(5) can be computed very efficiently to generate aerodynamic forces at the shaker locations in real-time.

The real-time unsteady aerodynamic force generation software 400 reads the structural responses 601 (FIG. 4) from the sensors 102a-102c (FIG. 4) as its inputs. The inputs 102a-102c shown in FIG. 5 correspond to the output of the sensor 102a-102c in FIG. 4, and which are LVT (displacement), LVDT (velocity) and accelerometer sensors. The desired force 603 computed by the real-time unsteady aerodynamic force generation software 400 is passed to the shakers 103 (FIG. 4) through the data acquisition system 200 (FIG. 4).

Figure 6:
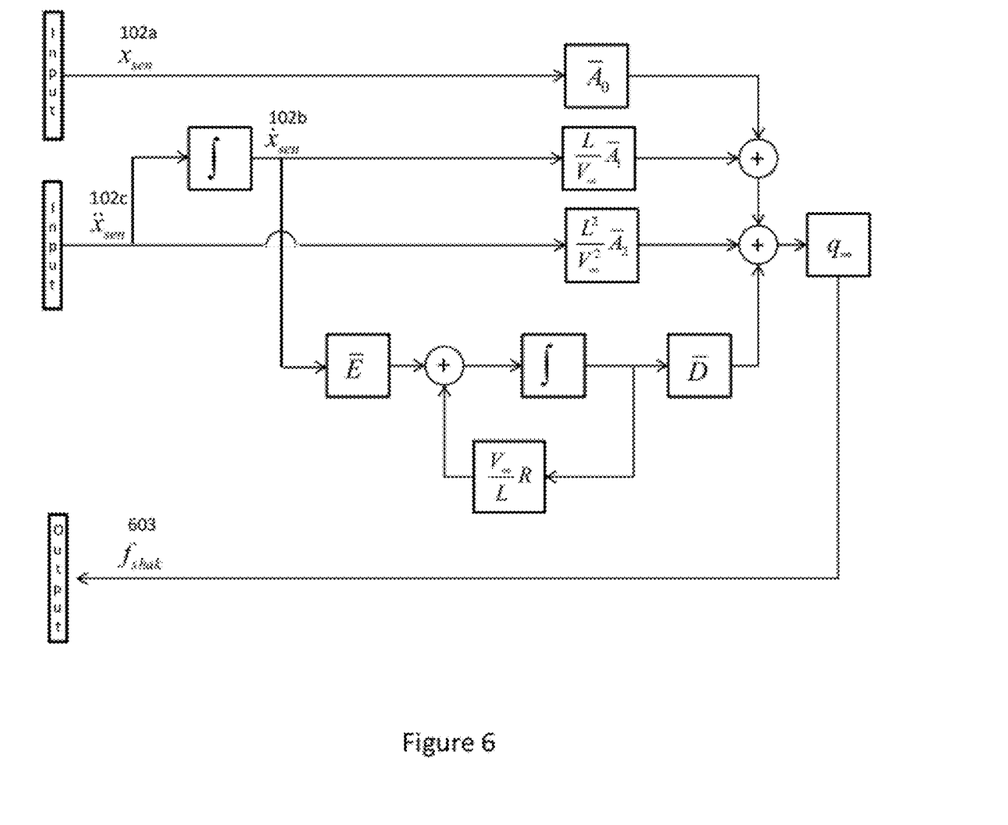
FIG. 6 illustrates another real-time unsteady aerodynamic force generation software process.

FIG. 6 demonstrates another process of the real-time unsteady aerodynamic force generation software 400. In this process it uses the displacement 102a and acceleration 102c as inputs, and outputs the desired force 603 to the shakers 103 (FIG. 4) through the data acquisition system 200. The velocity 102b is calculated by the integration of the acceleration 102c.

Both processes demonstrated in FIGS. 5 and 6 can be used to determine the desired force. The selection of which process to use is based on what information and which sensors are available.

What is claimed is:

1. A Dry Wind Tunnel (DWT) method that is used to predict the flutter boundaries of a structure without using a wind tunnel, said DWT method comprising the following steps:
   (a) providing:
      (i) at least one shaker, for shaking such structure, coupled to such structure at at least one shaker location;
      (ii) at least one computer communicatively coupled to said at least one shaker and storing and operable to execute a force controller software for generating force control signals for controlling said at least one shaker;
      (iii) at least one displacement sensor mounted on such structure;
      (iv) at least one velocity sensor mounted on such structure;
      (v) at least one acceleration sensor mounted on such structure;
      (vi) at least one load cell mounted between said at least one shaker and such structure; and
      (vii) a data acquisition system communicatively coupled to said at least one displacement sensor, said at least one velocity sensor, said at least one acceleration sensor, said at least one load cell, and said at least one computer;
   (b) loading a real-time unsteady aerodynamic force generation software stored in and executable on said at least one computer that is able to compute initial real-time unsteady aerodynamic force on said structure at said at least one shaker location;
   (c) controlling, using said at least one computer, said at least one shaker to exert an initial impulse on such structure;
   (d) receiving, in said at least one computer, initial data from said at least one displacement sensor, said at least one velocity sensor, and said at least one acceleration sensor via said data acquisition system, responsive to said initial impulse;
   (e) computing test inputs for controlling said at least one shaker, responsive to said initial data and using said real-time unsteady aerodynamic force generation software;
   (f) controlling said at least one shaker, responsive to said test inputs and using said force controller software, to shake such structure;
   (g) measuring, via said at least one computer:
      i) structural response of said structure using said real-time unsteady aerodynamic force generation software and structural response data from said at least one displacement sensor, said at least one velocity sensor, and said at least one acceleration sensor; and
      ii) said force exerted on said structure, using said force controller software and said at least one computer, responsive to data from said at least one load cell;
   (h) computing, using said at least one computer running said force generation software and responsive to said measured structural response as input, an unsteady aerodynamic force at said at least one shaker location;
   (i) applying said computed unsteady aerodynamic force to said structure through said at least one shaker;
   (j) controlling, using said force controller software, said applied forces to be the same as said real-time unsteady aerodynamic forces computed using said real-time unsteady aerodynamic force generation software;
   (k) monitoring said structural response data in real time;
   (l) if said structural response data indicates a decay motion, incrementally changing said inputs to create incremented test inputs to said real-time unsteady aerodynamic force generation software;
   (m) repeating steps (f) to (l) until said structural response data indicates a divergent motion;
   (n) designating a condition between said decay motion and said divergent motion of such structure as a predicted flutter boundary of such structure.

* * * * *